W. L. HAWKINS.
LIQUID FUEL BURNER.
APPLICATION FILED SEPT. 12, 1910.
998,337.
Patented July 18, 1911.
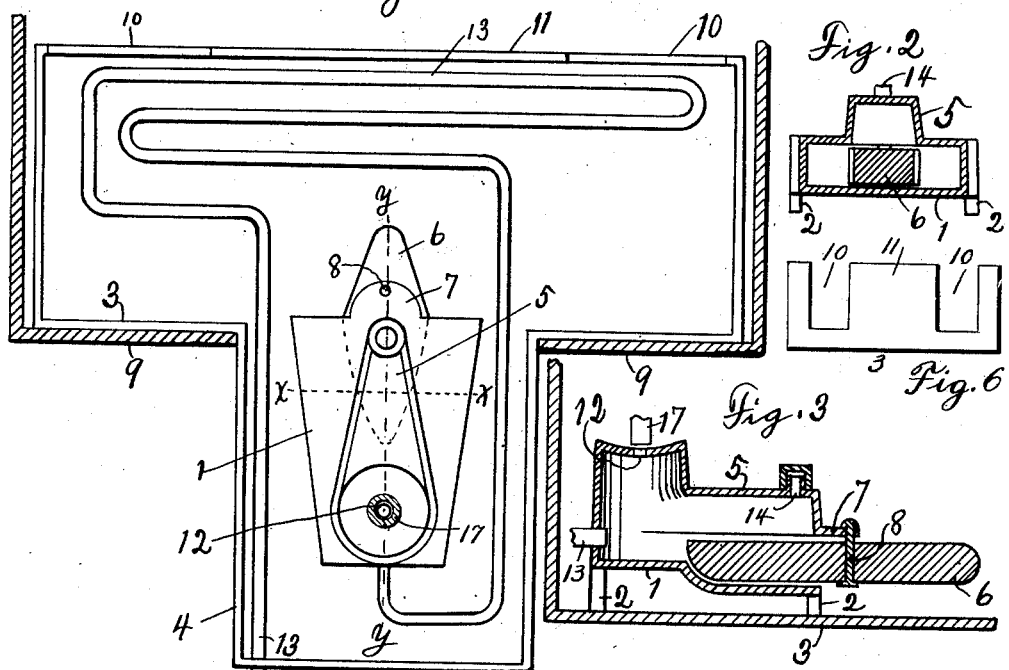
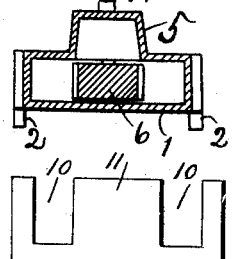
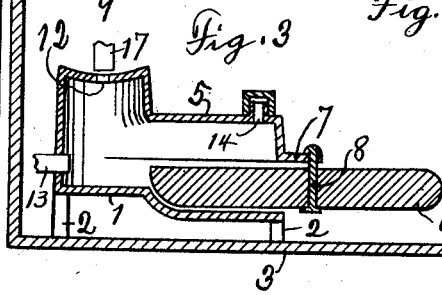
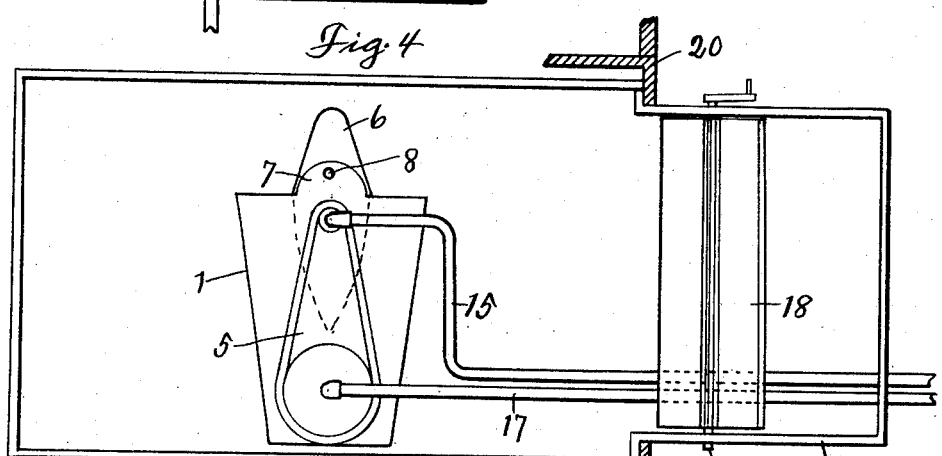
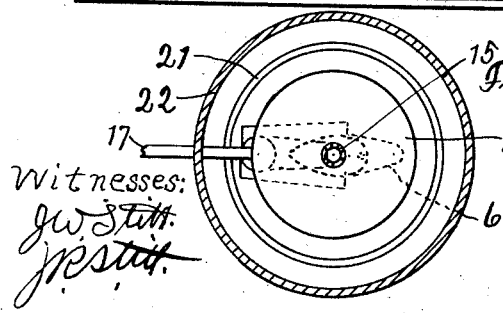
Witnesses:
Inventor,
W. L. Hawkins,
By A. L. Jackson,
Atty.

UNITED STATES PATENT OFFICE.

WILLIAM L. HAWKINS, OF FORT WORTH, TEXAS.

LIQUID-FUEL BURNER.

998,337.  Specification of Letters Patent.  Patented July 18, 1911.

Application filed September 12, 1910. Serial No. 581,726.

*To all whom it may concern:*

Be it known that I, WILLIAM L. HAWKINS, a citizen of the United States, residing at Fort Worth, in the county of Tarrant and State of Texas, have invented certain new and useful Improvements in Liquid-Fuel Burners, of which the following is a specification.

My invention relates to devices for burning liquid fuel and more particularly to devices for burning crude petroleum, and the object is to provide inexpensive and durable devices with which liquid fuel can be economically used for cooking and heating and smelting and other purposes.

Another object is to provide devices which will cause complete combustion of all the fuel so that a stove or heater will not become clogged with unconsumed fuel. Other objects and advantages will be fully explained in the following description and the invention will be more particularly pointed out in the claims.

Reference is had to the accompanying drawings which form a part of this application.

Figure 1 is a plan view, showing a complete burner mounted in a fuel pan and showing the relative location of the pan in a cooking stove. Fig. 2 is a vertical section of the burner, taken on the line $x$—$x$ of Fig. 1. Fig. 3 is a vertical section of the burner, taken on the line $y$—$y$ of Fig. 1. Fig. 4 is a plan view of the burner, showing a variation in the fuel pan, showing the relative location of the fuel pan to the cooking stove. Fig. 5 is a plan view of the burner, on a smaller scale, showing the fuel pan adapted for use in a heater. Fig. 6 is a rear elevation of the fuel pan.

Similar characters of reference are used to indicate the same parts throughout the several views.

The burner includes an irregularly shaped hollow receiver 1 provided with legs 2 to rest in an oil pan 3. The oil pan 3 has a draft extension 4 which projects outside of the stove. The form of can shown in Figs. 1 and 3 projects out of the front 9 of the fire box. The receiver 1 has a raised portion 5 for the circulation and passage of the vapors of oil and the oil to the spreader 6. The receiver 1 has a horizontally projecting lip 7 and the spreader 6 is pivotally suspended from the lip 7. The spreader 6 may be swung on the pivot bolt 8 so that more heat can be thrown to one side or the other of the stove. The oil pan 3 is substantially coextensive with the inside of the fire box of the stove. The wall of the oil pan is cut away at 10 so that the heat will strike the oven part of the stove, but a baffle wall 11 is left to prevent too much heat from striking the oven. The burner is provided with legs 2 so that there will be no place for accumulation of unconsumed fuel. Oil may be fed to the burner through the opening 12. In Fig. 1 provision is made for feeding steam to the burner to be mixed with the vaporized oil. A pipe 13 is circulated in the oil pan and connected with the receiver 1. If water is fed to the pipe 13, it will be converted to steam by the time it runs through the part of the pipe in the oil pan and back to the receiver. Instead of the pipe 13, water may be fed directly to the spreader 6 through an opening 14 and pipe 15. The water will be converted to steam instantly. Attention is called to the approximately diamond-shaped appearance of the spreader. This particular shape makes a convenient device for directing the products of combustion to either side of the stove, and also for spreading the products of combustion when in its normal position. The receiver 1 is not air-tight, consequently air will enter the receiver at several places.

The form of the oil pan shown in Fig. 4 differs slightly from the oil pan shown in Fig. 1. The oil pan of Fig. 4 may have a draft extension 16 projecting out of the door of a stove. The construction of the burner is the same as in the previous figures. An oil pipe 17 is shown projecting to the opening 12. A draft regulator 18 is shown mounted in the extension 16 on a pivot rod 19 so that the regulator can be set at any angle for controlling the draft and for preventing the heat from going out through the extension 16. A similar regulator may be used with the extension 4 shown in Fig. 1. In Fig. 4, 20 indicates the parts of a stove about the door and the door may be removed when the oil pan with its extension is mounted in the fire box of the stove.

Fig. 5 shows the burner mounted in a heater. In this application a circular oil pan 21 is mounted in the heater 22. The construction of the burner is the same, having an oil feeding pipe 17 and a water feed pipe A hood 23 is mounted above the burner for causing an even distribution of the heat throughout the heater.

In addition to the uses of the improved burner above pointed out, it may be used with stationary and locomotive engine boilers, and in furnaces for various purposes.

Having fully described my invention, what I claim as new and desire to secure by Letters Patent, is,—

1. An oil burner comprising an oil pan having a body portion and a draft extension, an irregularly shaped hollow receiver mounted in said draft extension, and a spreader pivotally attached to said receiver and projecting within said receiver and within the body portion of said oil pan.

2. A liquid fuel burner comprising an oil pan having a body portion and a draft extension, a hollow fuel receiver mounted in said extension and provided with receiving orifices and having a horizontally projecting lip, and a spreader pivotally attached to said lip and projecting within said receiver and within the body portion of said oil pan.

3. A liquid fuel burner comprising an oil pan having a body portion and a draft extension, a hollow fuel receiver mounted in said extension and having a horizontally projecting lip, and a spreader pivotally attached to said lip and projecting within said receiver and within the body portion of said oil pan, said receiver having an elevated portion for directing fuel toward said spreader and having a wider portion below the elevated portion for the movement of said spreader.

4. A liquid fuel burner comprising an oil pan, a receiver mounted in said oil pan and provided with a horizontally projecting lip, and a spreader pivotally attached to said lip and projecting within said receiver and without said receiver within said oil pan.

5. A liquid fuel burner comprising an oil pan, a receiver provided with legs and mounted in said oil pan, and having a horizontally projecting lip, and a spreader pivotally attached to said lip and projecting within and without said receiver, said receiver having a wide cavity for permitting movement of said spreader and a narrow cavity above said spreader for directing the ignited fuel toward the spreader.

In testimony whereof, I set my hand in the presence of two witnesses, this 29th day of August, 1910.

WILLIAM L. HAWKINS.

Witnesses:
A. L. JACKSON,
J. W. STETT.

---

Copies of this patent may be obtained for five cents each, by addressing the "Commissioner of Patents, Washington, D. C."